(12) United States Patent
Chang (10) Patent No.: US 7,918,599 B2
(45) Date of Patent: *Apr. 5, 2011

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 157 days.

This patent is subject to a terminal disclaimer.

(21) Appl. No.: 11/949,053

(22) Filed: Dec. 3, 2007

(65) Prior Publication Data
US 2009/0021947 A1  Jan. 22, 2009

(30) Foreign Application Priority Data

Jul. 20, 2007  (CN) .......................... 2007 1 0201138

(51) Int. Cl.
*F21V 7/04* (2006.01)
(52) U.S. Cl. ........ 362/615; 362/612; 362/613; 362/621; 362/628
(58) Field of Classification Search .................. 362/615, 362/621, 628, 612, 613
See application file for complete search history.

(56) References Cited

U.S. PATENT DOCUMENTS

| 5,197,792 | A | 3/1993 | Jiao et al. | |
|---|---|---|---|---|
| 7,551,243 | B2* | 6/2009 | Cernasov | 362/612 |
| 2003/0058390 | A1* | 3/2003 | Fujii | 349/113 |
| 2007/0086179 | A1* | 4/2007 | Chen et al. | 362/613 |
| 2007/0263408 | A1* | 11/2007 | Chua | 362/612 |
| 2007/0285941 | A1* | 12/2007 | Ishihara et al. | 362/606 |
| 2008/0055931 | A1* | 3/2008 | Verstraete et al. | 362/612 |
| 2009/0160758 | A1* | 6/2009 | Manabe et al. | 345/102 |
| 2009/0196069 | A1* | 8/2009 | Iwasaki | 362/613 |

FOREIGN PATENT DOCUMENTS

CN  1186678 C  1/2005

* cited by examiner

*Primary Examiner* — Sandra L O Shea
*Assistant Examiner* — William J Carter
(74) *Attorney, Agent, or Firm* — Frank R. Niranjan (57) ABSTRACT

An exemplary optical plate includes at least one transparent plate unit. The transparent plate unit includes a light output surface, a bottom surface, a plurality of enclosing V-shaped protrusions, a plurality of microstructures and a lamp-receiving portion. The light output surface and the bottom surface are on opposite sides of the optical plate. The enclosing V-shaped protrusions are formed on the bottom surface. The microstructures are formed on the light output surface. Each microstructure has circular cross-section taken along a plane parallel to its base surface thereof, a diameter of the circular cross-section decreasing along a direction away from its base surface thereof. The lamp-receiving portion is defined in at least one of the light output surface and the bottom surface. A backlight module using the present optical plate is also provided.

16 Claims, 12 Drawing Sheets

OPTICAL PLATE AND BACKLIGHT MODULE USING THE SAME

CROSS-REFERENCE TO RELATED APPLICATIONS

This application is related to twenty-one co-pending U.S. patent applications, which are: applications Ser. No. 11/835,425, Ser. No. 11/835,426, Ser. No. 11/835,427, Ser. No. 11/835,428, Ser. No. 11/835,429, Ser. No. 11/835,430, and Ser. No. 11/835,431, filed on Aug. 8, 2007, and all entitled "OPTICAL PLATE AND BACKLIGHT MODULE USING THE SAME", application Ser. No. 11/836,799 filed on Aug. 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", applications Ser. No. 11/843,670 and Ser. No. 11/843,669, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", applications Ser. No. 11/845,790, Ser. No. 11/845,792, Ser. No. 11/845,793, and Ser. No. 11/845,794, filed on Aug. 28, 2007, all entitled "OPTICAL PLATE AND BACKLIGHT MODULE USING THE SAME", and applications Ser. No. 11/850,040 and Ser. No. 11/850,041, filed on Sep. 5, 2007, both entitled "OPTICAL PLATE AND BACKLIGHT MODULE USING THE SAME", and applications Ser. No. 11/861,310, and Ser. No. 11/861,311, filed on Sep. 26, 2007, both entitled "OPTICAL PLATE AND BACKLIGHT MODULE USING THE SAME". In all the co-pending applications except application Ser. No. 11/845,790, the inventor is Shao-Han Chang. In application Ser. No. 11/845,790, the inventors are Shao-Han Chang and Fen Chen. All of the co-pending applications have the same assignee as the present application. The disclosures of the above identified applications are incorporated herein by reference.

BACKGROUND OF THE INVENTION

1. Field of the Invention

The present invention relates to optical plates, and particularly, to an optical plate used in a backlight module.

2. Discussion of the Related Art

In a liquid crystal display device, liquid crystal is a substance that does not illuminate light by itself. Instead, the liquid crystal relies on light received from a light source to display information. In a typical liquid crystal display device, a backlight module powered by electricity supplies the needed light.

Figure 12:
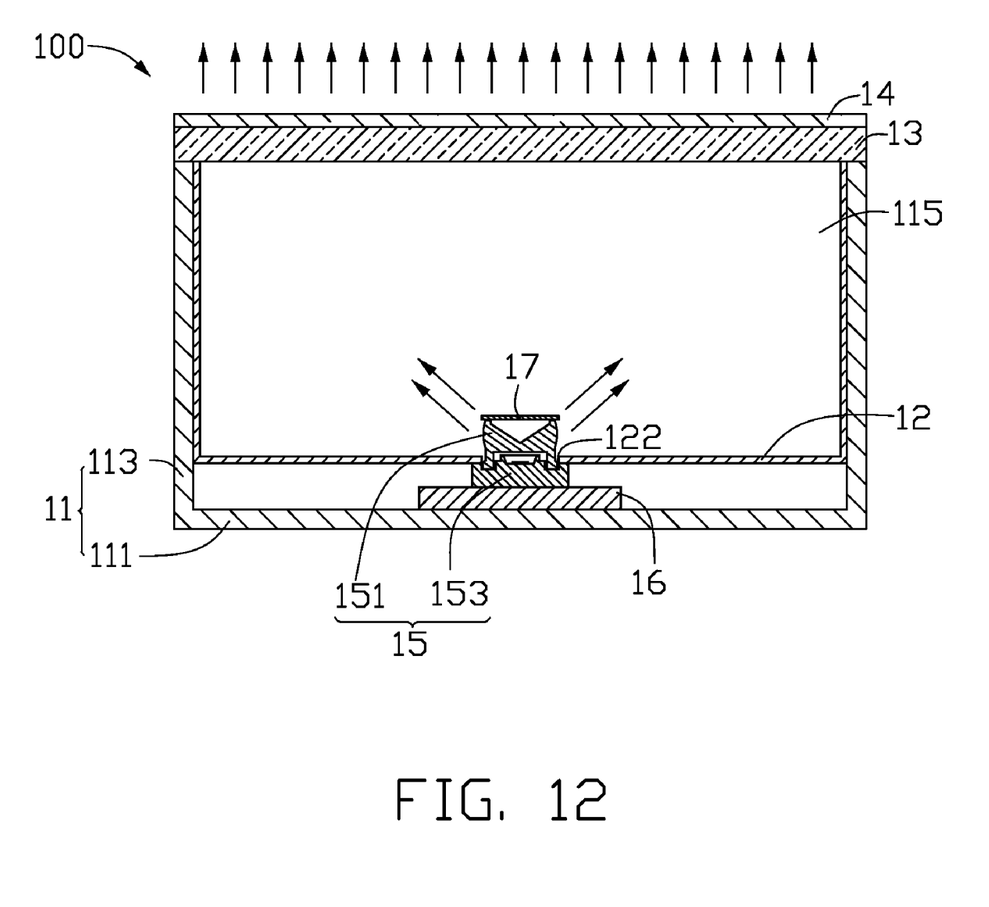
FIG. 12 is a side cross-sectional view of a conventional backlight module.

FIG. 12 represents a typical direct type backlight module 100. The backlight module 100 includes a housing 11, a light reflective plate 12, a light diffusion plate 13, a prism sheet 14, and a plurality of light emitting diodes 15 (hereinafter called LEDs). The housing 11 includes a rectangular base 111 and four sidewalls 113 extending around a periphery of the base 111. The base 111 and the four sidewalls 113 cooperatively define a chamber 115. Each LED 15 includes a base portion 153 and a light-emitting portion 151 disposed on the base portion 153. The LEDs 15 are electrically connected to a printed circuit board 16 that is fixed to the base 111 of the housing 11. The light reflective plate 12 is disposed on the LEDs 15 in the chamber 115. The light reflective plate 12 defines a plurality of through holes 122 that allows the light-emitting portions 151 of the LEDs 15 to pass through correspondingly. The light diffusion plate 13 and the prism sheet 14 are stacked in that order on the chamber 115. Light emitted from the LEDs 15 is substantially reflected by the light reflective sheet 12, and then enters the light diffusion plate 13. The light is diffused uniformly in the light diffusion plate 13, and finally concentrated at the prism sheet 14.

Generally, a plurality of dark areas may occur because of reducing intensity of light between adjacent LEDs 15. In the backlight module 100, each LED 15 further includes a reflective sheet 17 disposed on the top of the light-emitting portion 151, configured for decreasing the brightness of a portion of the backlight module 100 above the LED 15. However, the brightness of the backlight module 100 is still not uniform. One method of enhancing the uniformity of brightness of the backlight module 100 is to increase the space between the light diffusion plate 13 and the LEDs 15. However, increasing the space between the diffusion plate 13 and the LEDs 15 will also increase the thickness of the backlight module and further the overall intensity of the output light rays is reduced.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a light output surface, a bottom surface, a plurality of enclosing V-shaped protrusions, a plurality of microstructures and a lamp-receiving portion. The light output surface and the bottom surface are on opposite sides of the optical plate. The enclosing V-shaped protrusions are formed on the bottom surface. The microstructures are formed on the light output surface. Each microstructure has circular cross-section taken along a plane parallel to its base surface thereof, and a diameter of the circular cross-section decreasing along a direction away from its base surface thereof. The lamp-receiving portion is defined in at least one of the light output surface and the bottom surface.

A backlight module according to a preferred embodiment includes a housing, a point light source, a reflective member, an optical plate, and a light diffusion plate. The housing includes a base and a plurality of sidewalls extending around a periphery of the base, the base and the sidewalls cooperatively forming an opening. The point light source is disposed on the base and has a light-emitting portion. The reflective member is disposed above the top portion of the light-emitting portion of the corresponding point light source. The same optical plate as described in the previous paragraph is employed in this embodiment. The light-emitting portion of the point light source is inserted in the lamp received portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
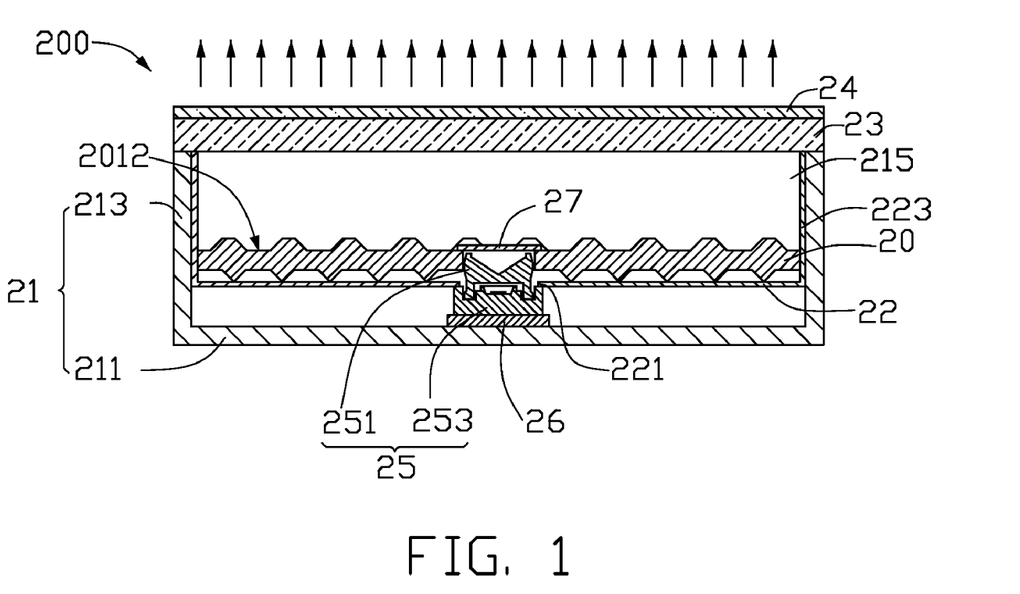
FIG. 1 is a side cross-sectional view of a backlight module having an optical plate according to a first preferred embodiment of the present invention.

Referring to FIG. 1, a backlight module 200 in accordance with a first preferred embodiment of the present invention is shown. The backlight module 200 includes a housing 21, a light reflective plate 22, a light diffusion plate 23, an LED 25, a reflective member 27, and an optical plate 20. The housing 21 includes a rectangular base 211 and four sidewalls 213 extending from a periphery of the base 211. The base 211 and the sidewalls 213 cooperatively form an opening 215. The optical plate 20, the light reflective plate 22, and the LED 25 are positioned in the housing 21 correspondingly, and the light diffusion plate 23 is disposed on the housing 21 over the opening 215.

Figure 2:
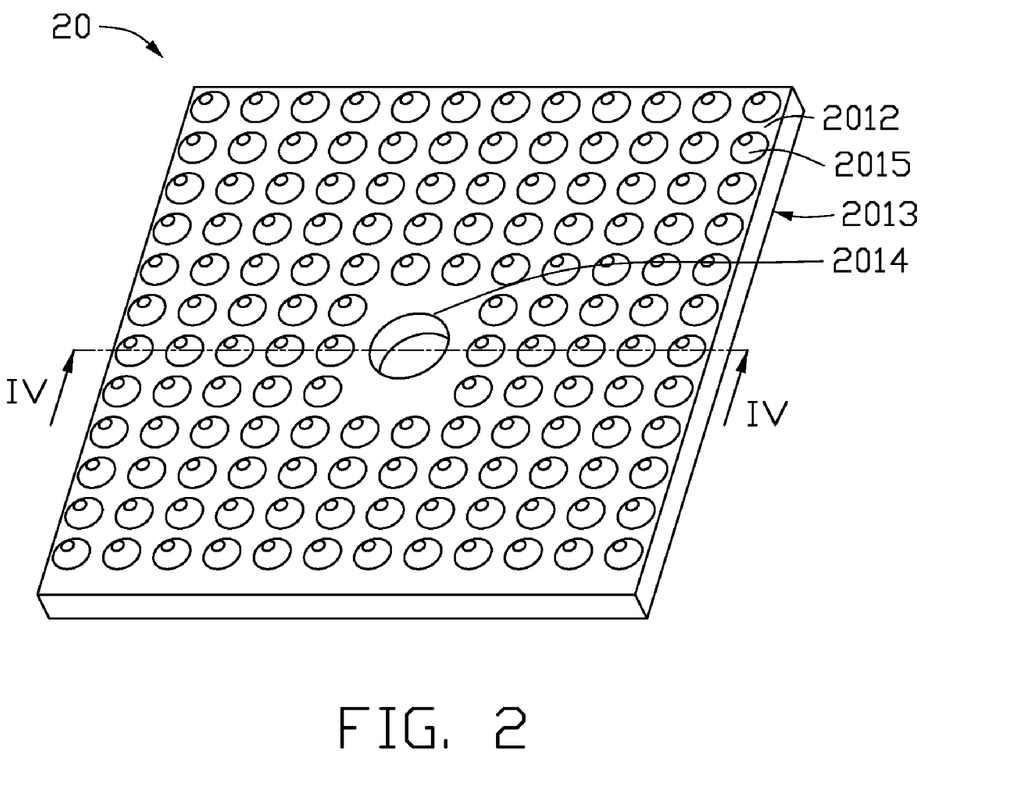
FIG. 2 is an isometric view of the optical plate of FIG. 1.
Figure 3:
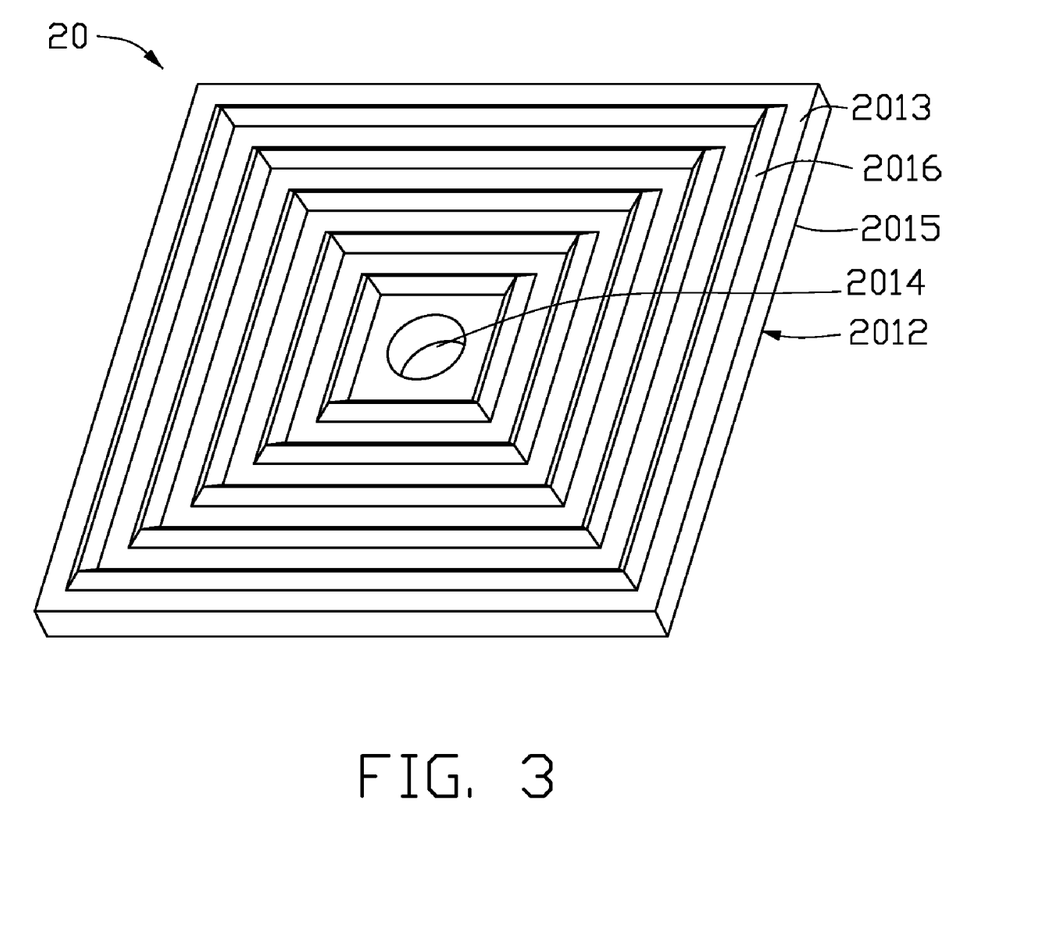
FIG. 3 is similar to FIG. 2, but viewed from another aspect.

Referring to FIGS. 2 and 3, the optical plate 20 is a transparent plate that can be mounted into the housing 21. The optical plate 20 includes a light output surface 2012 and a bottom surface 2013. The light output surface 2012 and the bottom surface 2013 are on opposite sides of the optical plate 20. A plurality of microstructures 2015 are formed on the light output surface 2012 and a plurality of square protrusions 2016 are formed on the bottom surface 2013. A diameter of a circular cross-section, taken along a plane parallel to a base of each microstructure 2015 decreases along a direction away from the base. In other words, a radius of each microstructure 2015 taken along an axis of symmetry of the microstructure 2015 decreases with increasing distance from the base.

The microstructures 2015 are distributed on the light output surface 2012 surrounding the lamp-receiving portion 2014 in a manner forming a rectangle or a square around the lamp-receiving portion 2014. The square protrusion 2016 forms a square wall surrounding the lamp-receiving portion 2014 in the bottom surface 2013. Each square protrusion 2016 has a triangular cross-section taken along a plane perpendicular to a side of the optical plate 20. The lamp-receiving portion 2014 is defined in a center of the bottom surface 2013. In the first preferred embodiment, the lamp-receiving portion 2014 is a through hole that communicates between the light output surface 2012 and the bottom surface 2013. A center of each square protrusion 2016 is aligned at the lamp-receiving portion 2014. The square protrusions 2016 are parallel to each other and a perimeter of each square protrusion 2016 increases with increasing distance from the lamp-receiving portion 2014.

Figure 4:
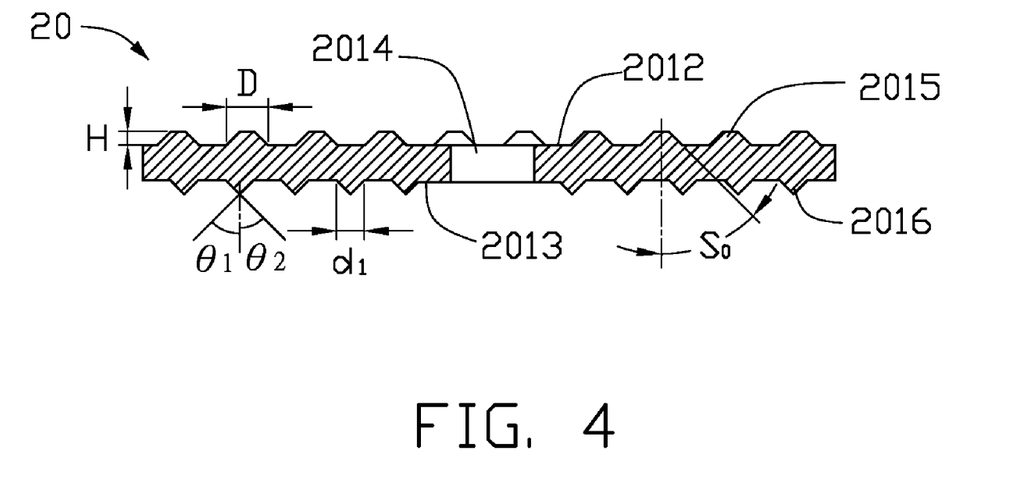
FIG. 4 is a side cross-sectional view taken along line IV-IV of FIG. 2.

In the first preferred embodiment, each microstructure 2015 is a conical frustum protrusion. Referring to FIG. 4, a maximum diameter D of each microstructure 2015 is configured to be in a range from about 0.02 millimeters to about 4 millimeters. A height H of each microstructure 2015 is configured to be in a range from about 0.01 millimeters to about 3 millimeters. A slope $S_0$ of slanted side surface of each microstructure 2015 with respect to a plane perpendicular to the bottom surface 2013 is larger than zero, and equal to or smaller than 60 degrees. The square protrusions 2016 are arranged at predetermined intervals. A maximum width $d_1$ of each of the sides of the square protrusions 2016 is configured to be in a range from about 0.05 millimeters to about 0.5 millimeters. Each square protrusion 2016 has a triangular cross-section taken along a plane perpendicular to a side of the optical plate 20. Each square protrusion 2016 has a first slanted side surface and a second slanted side surface. The first slanted side surface is adjacent to the lamp-receiving portion 2014. The first slanted side surface and the second slanted side surface of each square protrusion 2016 with respect to a plane perpendicular to the bottom surface 2013 define a first slope $\theta_1$ and a second slope $\theta_2$ correspondingly. The first slope $\theta_1$ is larger than zero, and equal to or smaller than 30 degrees. The second slope $\theta_2$ is configured to be in a range from about 15 degrees to about 60 degrees.

The optical plate 20 can be made from material selected from the group consisting of polycarbonate (PC), polymethyl methacrylate (PMMA), polystyrene (PS), copolymer of methylmethacrylate and styrene (MS), and any suitable combination thereof. A thickness of the optical plate 20 is preferably in a range from 0.5 millimeters to about 5 millimeters.

Referring to FIG. 1 again, the LED 25 includes a base portion 253, a light-emitting portion 251 disposed on the base portion 253. The LED 25 is electrically connected to a printed circuit board 26 that is fixed to the base 211 of the housing 21. In the first preferred embodiment, the reflective member 27 is a light reflective sheet that is disposed above the top of the light-emitting portion 251 on the light output surface 2012 of the optical plate 20. In an alternative embodiment, the reflective member 27 can be a light reflective film formed on the top of the light-emitting portion 251 or on the optical plate 20 above the lamp-receiving portion 2014.

The lamp-receiving portion 2014 of the optical plate 20 is inserted with the light-emitting portion 251 of the LED 25, and positioned in the backlight module 200 with the light output surface 2012 facing the light diffusion plate 23. A through hole 221 is defined in the light reflective plate 22. The through hole 221 is aligned with the lamp-receiving portion 2014 of the optical plate 20. The LED 25 protrudes through the through hole 221 of the light reflective plate 22, and then is inserted into the lamp-receiving portion 2014 of the optical plate 20. That is, the LED 25 is sequentially inserted through the through hole 221 and the lamp-receiving portion 2014. The LED 25 is disposed in the housing 21. The light reflective plate 22 is placed correspondingly in the housing 21 such that the through hole 221 of the light reflective plate 22 is sleeved on the LED 25. The optical plate 20 is correspondingly placed on top of the light reflective plate 22 such that the LED 25 is partially inserted into the lamp-receiving portion 2014 of the optical plate 20. The light reflective plate 22 and the optical plate 20 are supported on the base portion 253 of the LED 25.

In use, light emitted from the light-emitting portion 251 of the LED 25 enters the optical plate 20 via a surface of the optical plate 20 surrounding the lamp-receiving portion 2014. Then, the light is mostly transmitted through the optical plate 20. Since the square protrusions 2016 have a plurality of slanted side surfaces, a great amount of light can be directly reflected by the square protrusions 2016, and the great amount of light quickly exits the light output surface 2012.

In addition, the microstructures 2015 can condense and collimate light exiting from the light output surface 2012, thereby improving a light illumination brightness. Furthermore, because the LED 25 is positioned in the lamp-receiving portion 2014, light exits the light output surface 2012 of the optical plate 20 uniformly. Light from the optical plate 20 can be further substantially mixed in a chamber between the optical plate 20 and the light diffusion plate 23 before passing through the light diffusion plate 23 as uniform surface light. A distance from the LED 25 to the light diffusion plate 23 may be configured to be very small, with little or no potential risks of having dark areas on the portion of the backlight module 200 directly above the LED 25. Accordingly, the backlight module 200 can have a compact configuration while still providing good, uniform optical performance.

It should be pointed out that, the light reflective plate 22 can be omitted. In an alternative embodiment, a high reflectivity film can be deposited on inner surfaces of the base 211 and the sidewalls 213 of the housing 21. In other alternative embodiments, the interior of the housing 21 is configured to be highly reflective.

It is to be understood that, in order to improve a brightness of the backlight module 200 within a specific range of viewing angles, the backlight module 200 can further include a prism sheet 24 disposed on the light diffusion plate 23. In addition, in order to improve light energy utilization rate of the backlight module 200, the light reflective plate 22 can further include four reflective sidewalls 223 extending around a periphery thereof and contacting with the sidewalls 213 of the housing 21.

Figure 5:
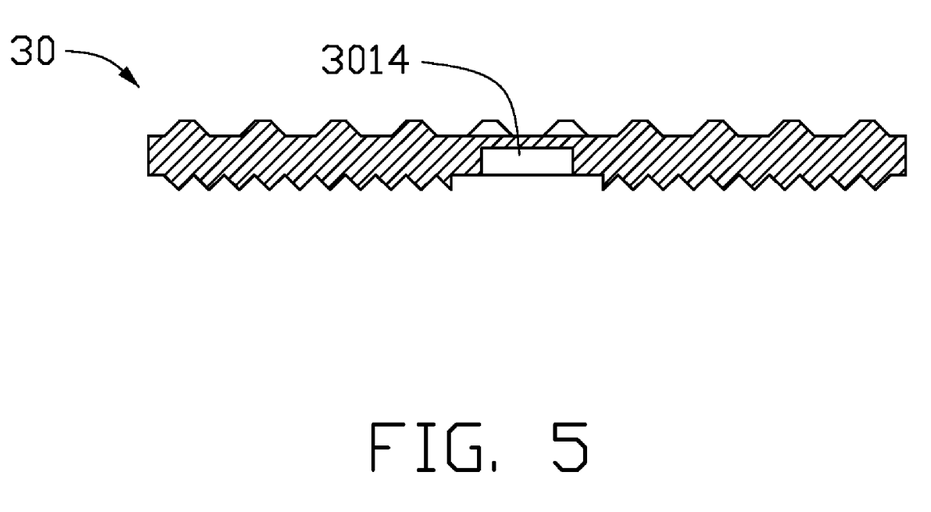
FIG. 5 is a side cross-sectional view of an optical plate according to a second preferred embodiment of the present invention.

Referring to FIG. 5, an optical plate 30 in accordance with a second preferred embodiment is shown. The optical plate 30 is similar in principle to the optical plate 20, except that a lamp-receiving portion 3014 of the optical plate 30 is a blind hole. It should be pointed out that, an LED having a reflective element disposed directly above the top of the light-emitting portion can be mounted into the lamp-receiving portion 3014 of the optical plate 30. Alternatively, a reflective member of the LED can also be positioned on a part of the optical plate 30 above the lamp-receiving portion 3014.

Figure 6:
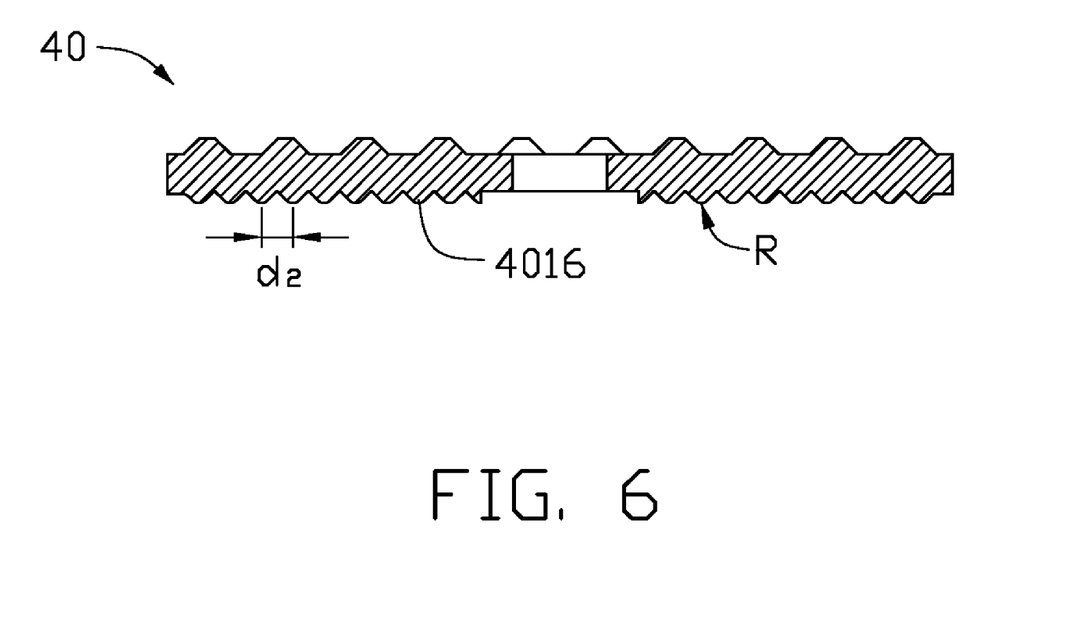
FIG. 6 is a side cross-sectional view of an optical plate according to a third preferred embodiment of the present invention.

Referring to FIG. 6, an optical plate 40 in accordance with a third preferred embodiment is shown. The optical plate 40 is similar in principle to the optical plate 20, except that a top edge of each square protrusion 4016 of the optical plate 40 is rounded. The radius of this rounded surface is configured to be R. A pitch between adjacent square protrusions 4016 is configured to be $d_2$. The radius R is equal to or less than 0.55 times $d_2$ and greater than zero.

Figure 7:
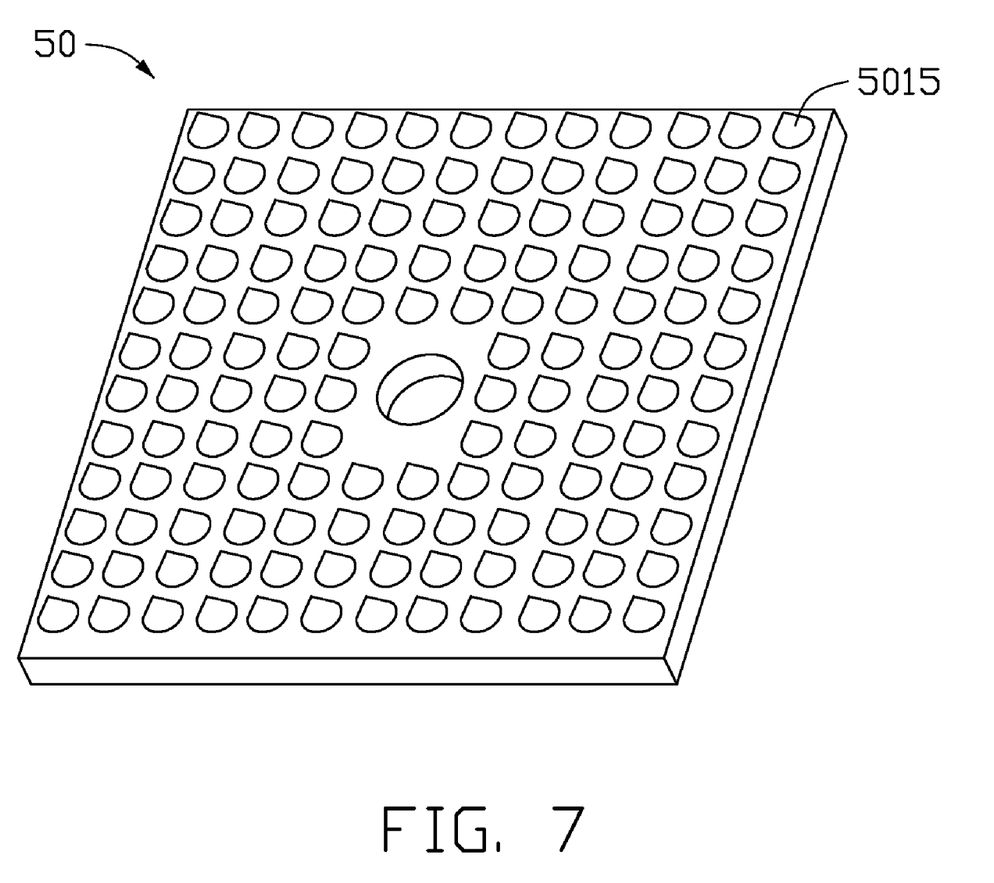
FIG. 7 is an isometric view of an optical plate according to a fourth preferred embodiment of the present invention.

Referring to FIG. 7, an optical plate 50 in accordance with a fourth preferred embodiment is shown. The optical plate 50 is similar in principle to the optical plate 20, except that each microstructure 5015 is conical protrusion. Each microstructure 5015 has circular cross-section taken along a plane parallel to its base surface, and a diameter of the circular cross-section decreasing along a direction away from its base surface.

Figure 8:
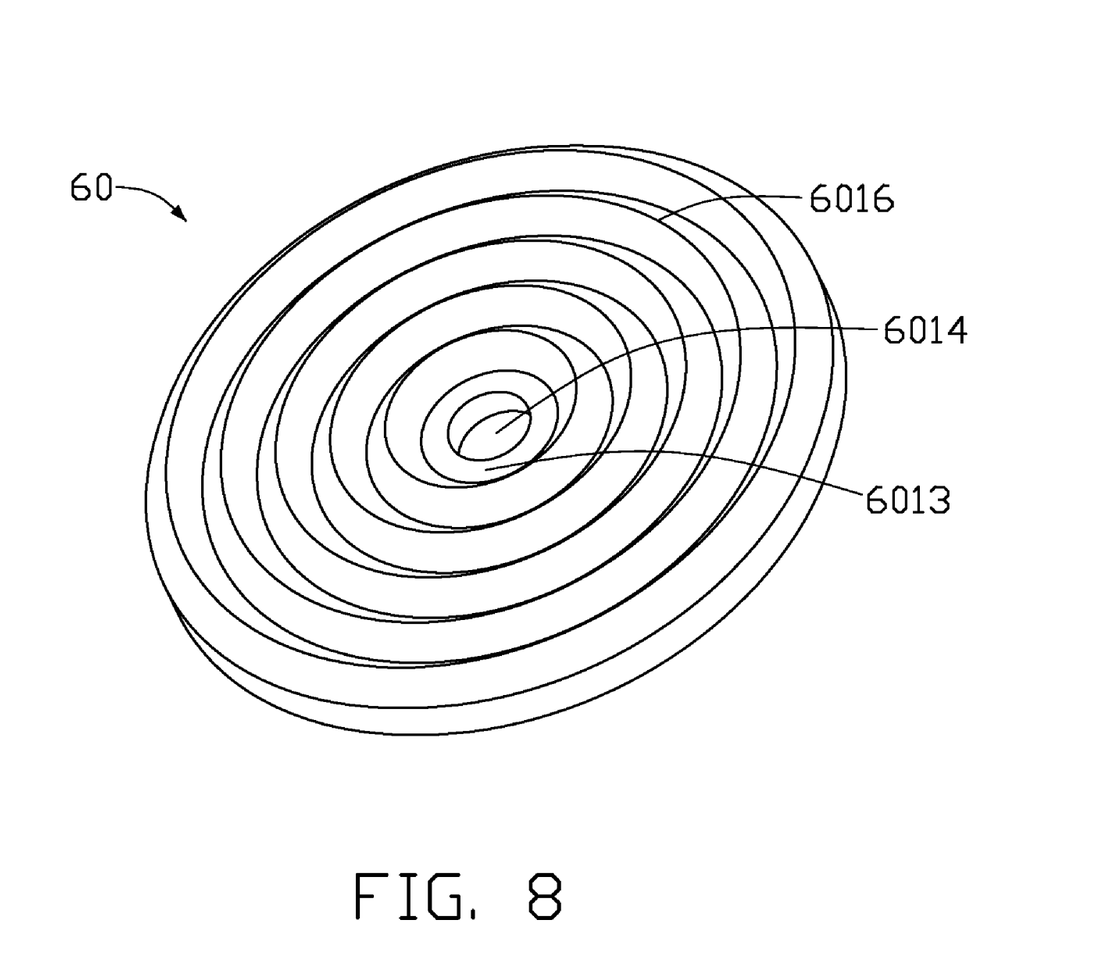
FIG. 8 is an isometric view of an optical plate according to a fifth preferred embodiment of the present invention.

Referring to FIG. 8, an optical plate 60 in accordance with a fifth preferred embodiment is shown. The optical plate 60 is similar in principle to the optical plate 20, except that the optical plate 60 is a circular in shape and each enclosing V-shaped protrusion 6016 formed on a bottom surface 6013 forms a substantially circular wall surrounding a lamp-receiving portion 6014.

Figure 9:
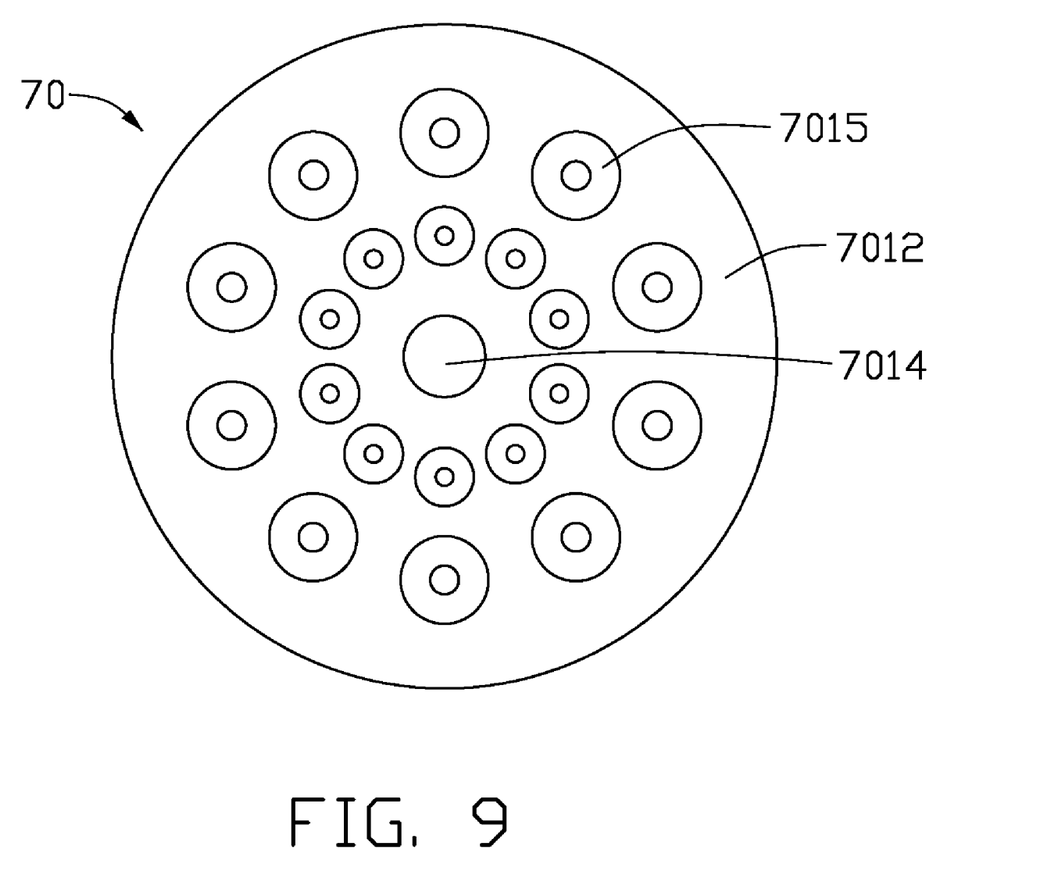
FIG. 9 is a top plane view of an optical plate according to a sixth preferred embodiment of the present invention.

Referring to FIG. 9, an optical plate 70 in accordance with a sixth preferred embodiment is shown. The optical plate 70 is similar in principle to the optical plate 20, except that a plurality of microstructures 7015 are formed on the light output surface 7012 surrounding a lamp-receiving portion 7014 in a circular manner. The microstructures 7015 are distributed symmetrically with respect to the lamp-receiving portion 7014. Maximum diameters of bottom surfaces of the microstructures 7015 increase with increasing distance from the lamp-receiving portion 7014. In this embodiment, the greater the distance between a particular microstructure 7015 and the lamp-receiving portion 7014, the more amount of light is adjusted by the particular microstructure 7015. Thus, uniformity of the light exiting the optical plate is further improved. In other alternative embodiment, if sizes of the microstructures 7015 are identical to each other, the same optical performance can be achieved by varying the distances between the microstructures 7015 and the lamp-receiving portion 7014.

Figure 10:
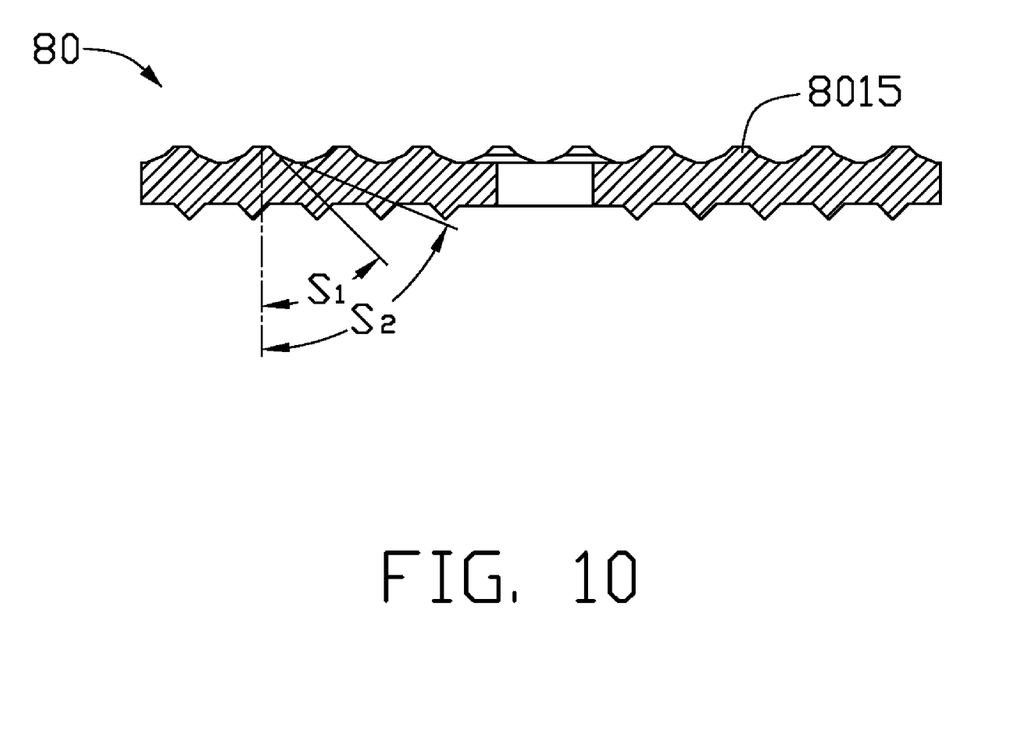
FIG. 10 is a side cross-sectional view of an optical plate according to a seventh preferred embodiment of the present invention.

Referring to FIG. 10, an optical plate 80 in accordance with a seventh preferred embodiment is shown. The optical plate 80 is similar in principle to the optical plate 20 of the first embodiment, however microstructures 8015 are different from the microstructures 2015 of the optical plate 20. Each microstructure 8015 is comprised of two conical frustum protrusions stacked together. The second conical frustum protrusion is disposed on top of the first conical frustum protrusion. In each microstructure 8015, side surfaces of the first conical protrusion and the second conical protrusion with respect to a plane perpendicular to a bottom surface of the optical plate 80 define two slopes $S_1$, $S_2$ correspondingly. The slope $S_1$ is equal to or less than the slope $S_2$. Each of the slopes $S_1$, $S_2$ is larger than zero, and equal to or smaller than 60 degrees.

It is noted that the scope of the present optical plate is not limited to the above-described embodiments. In particular, even though specific shape of microstructures 2015, 5015, 8015 have been described and illustrated, the microstructures 2015, 5015, 8015 can have various other suitable shapes. For example, the microstructures can be selected from conical frustum protrusions, conical protrusions and stacked conical frustum protrusions. The stacked conical frustum protrusions have at least two conical frustum protrusions stacked together.

Figure 11:
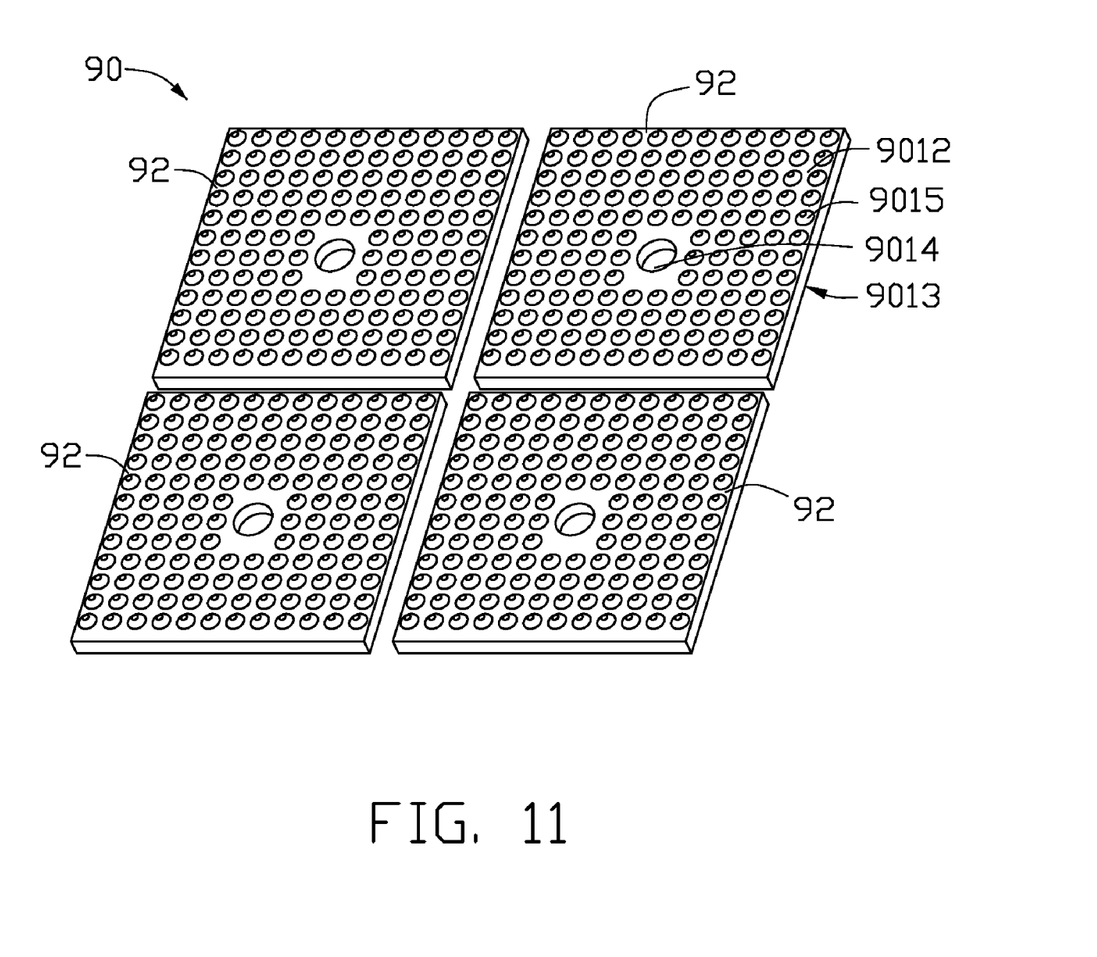
FIG. 11 is an isometric view of an optical plate according to a eighth preferred embodiment of the present invention.

Referring to FIG. 11, a combined optical plate 90 in accordance with an eighth preferred embodiment is shown. The combined optical plate 90 includes four transparent plate units 92 that can be combined together. Each transparent plate unit 92 is similar in principle to the optical plate 20. Each transparent plate section 92 includes a light output surface 9012, a bottom surface 9013 opposite to the light output surface 9012, a plurality of microstructures 9015 formed on the light output surface 9012, a plurality of enclosing V-shaped protrusions (not shown) formed in the bottom surface 9013, and a lamp-receiving portion 9014 communicating between the light output surface 9012 and the bottom surface 9013. Either microstructures 9015 formed on light output surface 9012 or enclosing V-shaped protrusions (not shown) formed on bottom surface 9013, are similar to those of the optical plate 20. In use, a plurality of LEDs and the combined optical plate 90 can be mounted into a housing to form a larger sized backlight module.

It should be noted that, the backlight module 200 is not limited to be configured with the optical plate 20 positioned in the housing 21 having the light output surface 2012 facing the light diffusion plate 23, but can also be configured with the optical plate 20 positioned in the housing 21 having the bottom surface 2013 facing the light diffusion plate 23. That is, the square protrusions 2016 are formed on a first surface of the optical plate 20, and the microstructures 2015 are formed on a second surface of the optical plate 20. The first surface is selected from one of the light output surface 2012 and the bottom surface 2013, and the second surface is selected from the other one of the light output surface 2012 and the bottom surface 2013. However, if a lamp-receiving portion is a blind hole, a surface where the blind hole is formed must be a bottom surface and the other surface must be a light output surface.

In the backlight module 200, a plurality of red, green, and blue colored LEDs can be inserted into the lamp-receiving portion 2014 of the optical plate 20, such that blended white surface light can be obtained. It is to be understood that other kinds of point light source, such as field emission lamps and so on, can replace the LED 25 in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
at least one transparent plate unit having:
a first surface, wherein the first surface is flat;
a second surface opposite to the first surface;
a plurality of enclosing V-shaped protrusions formed on the first surface;
a plurality of stacked conical frustum protrusions formed on the second surface; and
at least one lamp-receiving portion defined in at least one of the first surface and the second surface, wherein each enclosing V-shaped protrusion forms a square wall surrounding the at least one lamp-receiving portion, and top tips of each enclosing V-shaped protrusion are positioned in a same plane that is parallel to the first surface.

2. The optical plate according to claim 1, wherein each enclosing V-shaped protrusion has a first slanted side surface and a second slanted side surface; the first slanted side surface is adjacent to the lamp-receiving portion; the first slanted side surface and the second slanted side surface of each enclosing V-shaped protrusion with respect to a plane perpendicular to the first surface of the optical plate define a first slope and a second slope correspondingly; the first slope is in a range from above 0 to about 30 degrees; the second slope is configured to be in a range from about 15 degrees to about 60 degrees.

3. The optical plate according to claim 1, wherein a top edge of each enclosing V-shaped protrusion is rounded.

4. The optical plate according to claim 1, wherein the stacked conical frustum protrusions are distributed symmetrically with respect to the lamp-receiving portion, maximum diameters of bottom surfaces of the stacked conical frustum protrusions increasing along directions away from the lamp-receiving portion.

5. The optical plate according to claim 1, wherein the at least one lamp-receiving portion is selected from one of blind hole and through hole communicating between the first surface and the second surface.

6. The optical plate according to claim 1, wherein a number of the at least one transparent plate unit is more than two, the transparent plate units being tightly combined with each other.

7. A backlight module comprising:
a housing having a base and a plurality of sidewalls extending around a periphery of the base, the base and the sidewalls cooperatively forming an opening;
at least one point light source disposed on the base, each point light source having a light-emitting portion;
at least one reflective member positioned above the top of the light-emitting portion;
an optical plate positioned in the housing, the optical plate including at least one transparent plate unit having:
a first surface, wherein the first surface is flat;
a second surface opposite to the first surface;
a plurality of enclosing V-shaped protrusions formed on the first surface;
a plurality of stacked conical frustum protrusions formed in the second surface, and at least a lamp-receiving portion defined in at least one of the first surface and the second surface, wherein the light-emitting portion of the at least one point light source is inserted in the lamp-receiving portion correspondingly, each enclosing V-shaped protrusion forms a square wall surrounding the at least one lamp-receiving portion, and top tips of each enclosing V-shaped protrusion are positioned in a same plane that is parallel to the first surface; and
a light diffusion plate disposed on the housing over the opening.

8. The backlight module according to claim 7, further comprising a light reflective plate defining a through hole therein, the light reflective plate being disposed underneath a bottom surface of the optical plate, and the light emitting potion of the point light source passing through the through hole of light reflective plate correspondingly.

9. The backlight module according to claim 8, further comprises a plurality of reflective sidewalls extending around a periphery thereof and contacting with the sidewalls of the housing.

10. The backlight module according to claim 7, wherein the housing is made of metal materials, and has high reflectivity inner surface.

11. The backlight module according to claim 7, further comprising a high reflectivity film deposited on inner surface of the base and the sidewalls of the housing.

12. The backlight module according to claim 7, further comprising a prism sheet disposed on the light diffusion plate.

13. The backlight module according to claim 7, wherein the lamp-receiving portion is selected from one of blind hole and through hole communicating with the first surface and the second surface.

14. The backlight module according to claim 7, wherein each enclosing V-shaped protrusion has a first slanted side surface and a second slanted side surface; the first slanted side surface is adjacent to the lamp-receiving portion; the first slanted side surface and the second slanted side surface of each enclosing V-shaped protrusion with respect to a plane perpendicular to the first surface of the optical plate define a first slope and a second slope correspondingly; the first slope is in a range from above 0 to about 30 degrees; the second slope is configured to be in a range from about 15 degrees to about 60 degrees.

15. The backlight module according to claim 7, wherein a top edge of each enclosing V-shaped protrusion is rounded.

16. The backlight module according to claim 7, wherein the stacked conical frustum protrusions are distributed symmetrically with respect to the lamp-receiving portion, maximum diameters of bottom surfaces of the stacked conical frustum protrusions increasing along a direction away from the lamp-receiving portion.

* * * * *